(12) United States Patent
Al-Yami et al.

(10) Patent No.: US 11,261,364 B2
(45) Date of Patent: *Mar. 1, 2022

(54) SPACER FLUIDS AND CEMENT SLURRIES THAT INCLUDE SURFACTANTS

(71) Applicant: Saudi Arabian Oil Company, Dhahran (SA)

(72) Inventors: Abdullah Al-Yami, Dhahran (SA); Hussain AlBahrani, Qatif (SA); Vikrant Wagle, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,995

(22) Filed: Oct. 21, 2020

(65) Prior Publication Data

US 2021/0032525 A1    Feb. 4, 2021

Related U.S. Application Data

(63) Continuation of application No. 15/586,543, filed on May 4, 2017, now Pat. No. 10,844,266.

(Continued)

(51) Int. Cl.

| | |
|---|---|
| *E21B 33/14* | (2006.01) |
| *C09K 8/24* | (2006.01) |
| *E21B 21/00* | (2006.01) |
| *C09K 8/22* | (2006.01) |
| *C09K 8/467* | (2006.01) |
| *C10M 173/00* | (2006.01) |
| *C04B 24/02* | (2006.01) |
| *C04B 28/02* | (2006.01) |
| *C04B 28/04* | (2006.01) |
| *C04B 28/08* | (2006.01) |
| *C09K 8/74* | (2006.01) |
| *E21B 43/25* | (2006.01) |
| *C09K 8/03* | (2006.01) |
| *C09K 8/20* | (2006.01) |
| *B01F 17/00* | (2006.01) |
| *C09K 8/40* | (2006.01) |
| *C09K 8/035* | (2006.01) |
| *C09K 8/08* | (2006.01) |

(Continued)

(52) U.S. Cl.
CPC ............ *C09K 8/24* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 8/03* (2013.01); *C09K 8/28* (2013.01); *C09K 8/514* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2020/017* (2020.05); *C10N 2020/02* (2013.01); *C10N 2020/04* (2013.01); *C10N 2030/06* (2013.01); *C10N 2040/22* (2013.01); *C10N 2040/40* (2020.05); *C10N 2050/013* (2020.05); *Y02W 30/91* (2015.05)

(58) Field of Classification Search
None
See application file for complete search history.

(56) References Cited

U.S. PATENT DOCUMENTS

| | | | |
|---|---|---|---|
| 2,589,949 A | 3/1952 | Meadors | |
| 2,782,163 A | 2/1957 | Wilson | |

(Continued)

OTHER PUBLICATIONS

Nelson, E.B., Well cementing, vol. 28, pp. 5-25 through 5-34, ISBN 0-444-88751-2 (Year: 1990).*

(Continued)

*Primary Examiner* — Angela M DiTrani Leff
(74) *Attorney, Agent, or Firm* — Dinsmore & Shohl

(57) ABSTRACT

A well bore cementing system may comprise a spacer fluid and a cement slurry. The spacer fluid may be positioned within a well bore, and the spacer fluid may comprise a first surfactant package comprising one or more surfactants. The cement slurry may be positioned within the well bore, and the cement slurry may comprise a second surfactant package comprising one or more surfactants.

35 Claims, No Drawings

Related U.S. Application Data

(60) Provisional application No. 62/454,189, filed on Feb. 3, 2017, provisional application No. 62/454,192, filed on Feb. 3, 2017.

(51) Int. Cl.

| | |
|---|---|
| C09K 8/42 | (2006.01) |
| C09K 8/48 | (2006.01) |
| C04B 24/08 | (2006.01) |
| C09K 8/487 | (2006.01) |
| C04B 7/52 | (2006.01) |
| C09K 8/46 | (2006.01) |
| C09K 8/04 | (2006.01) |
| C04B 14/06 | (2006.01) |
| C04B 38/02 | (2006.01) |
| C10M 105/18 | (2006.01) |
| C10M 105/62 | (2006.01) |
| C10M 107/34 | (2006.01) |
| C10M 111/04 | (2006.01) |
| C09K 8/32 | (2006.01) |
| C09K 8/36 | (2006.01) |
| C10M 173/02 | (2006.01) |
| C10N 20/02 | (2006.01) |
| C10N 20/04 | (2006.01) |
| C10N 20/00 | (2006.01) |
| C10N 30/06 | (2006.01) |
| C10N 40/22 | (2006.01) |
| C10N 50/00 | (2006.01) |
| C10N 40/00 | (2006.01) |
| C09K 8/514 | (2006.01) |
| C09K 8/28 | (2006.01) |
| C04B 103/40 | (2006.01) |
| C04B 103/46 | (2006.01) |
| C04B 111/00 | (2006.01) |

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin |
| 3,048,538 A | 8/1962 | Rosenberg et al. |
| 3,319,714 A | 5/1967 | Knox |
| 3,353,603 A | 11/1967 | Knight |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A | 7/1981 | Bivens et al. |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A | 1/1994 | Cowan |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel et al. |
| 5,474,701 A | 12/1995 | Jaquess et al. |
| RE35,163 E | 2/1996 | Christensen et al. |
| 5,586,608 A | 12/1996 | Clark et al. |
| 5,593,953 A | 1/1997 | Malchow |
| 5,593,954 A | 1/1997 | Malchow |
| 5,602,082 A | 2/1997 | Hale et al. |
| 5,618,780 A | 4/1997 | Argillier et al. |
| 5,683,973 A | 11/1997 | Post et al. |
| 5,728,210 A | 3/1998 | Moran et al. |
| 5,744,432 A | 4/1998 | Barnhorst et al. |
| 5,830,831 A * | 11/1998 | Chan ............... B01F 17/0085 507/211 |
| 5,850,880 A | 12/1998 | Moran et al. |
| 5,996,693 A | 12/1999 | Heathman |
| 6,063,737 A | 5/2000 | Haberman et al. |
| 6,258,756 B1 | 7/2001 | Hayatdavoudi |
| 6,267,716 B1 | 7/2001 | Quintero |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 | 12/2005 | Stanger et al. |
| 7,081,438 B2 | 7/2006 | Horton |
| 7,262,152 B2 | 8/2007 | Montreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 7,951,755 B2 | 5/2011 | Wu et al. |
| 8,252,728 B2 | 8/2012 | Karagianni et al. |
| 8,403,051 B2 | 3/2013 | Huang et al. |
| 8,563,479 B2 | 10/2013 | Amanullah et al. |
| 8,703,658 B2 | 4/2014 | Smith |
| 8,741,989 B2 | 6/2014 | Martin et al. |
| 8,932,997 B2 | 1/2015 | Merli et al. |
| 8,936,111 B2 | 1/2015 | Maghrabi et al. |
| 9,006,151 B2 | 4/2015 | Amanullah et al. |
| 9,034,800 B2 | 5/2015 | Harris et al. |
| 9,127,192 B2 | 9/2015 | Maghrabi et al. |
| 9,175,205 B2 | 11/2015 | Amanullah et al. |
| 9,249,052 B2 | 2/2016 | Kawakami |
| 10,287,476 B2 | 5/2019 | Al-Yami et al. |
| 10,287,477 B2 | 5/2019 | Al-Yami et al. |
| 10,494,559 B2 | 12/2019 | Al-Yami et al. |
| 10,526,520 B2 | 1/2020 | Al-Yami et al. |
| 10,538,692 B2 | 1/2020 | Al-Yami et al. |
| 10,844,266 B2 * | 11/2020 | Al-Yami ............... C04B 24/026 |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0116304 A1 | 6/2004 | Wu et al. |
| 2004/0144537 A1 | 7/2004 | Reddy et al. |
| 2005/0049147 A1 | 3/2005 | Patel et al. |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1 | 4/2007 | Navarrete et al. |
| 2007/0191235 A1 | 8/2007 | Mas et al. |
| 2008/0006404 A1 | 1/2008 | Reddy et al. |
| 2008/0171671 A1 | 7/2008 | Mueller et al. |
| 2008/0194432 A1 | 8/2008 | Heidlas et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0131285 A1 | 5/2009 | Wang et al. |
| 2009/0200033 A1 | 8/2009 | Kakadjian et al. |
| 2009/0260885 A1 | 10/2009 | Pomerleau |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0173804 A1 | 7/2010 | Van de Peer et al. |
| 2010/0263863 A1 * | 10/2010 | Quintero ............... C09K 8/40 166/267 |
| 2010/0319915 A1 | 12/2010 | Bustos et al. |
| 2010/0326660 A1 | 12/2010 | Ballard et al. |

(56) References Cited

U.S. PATENT DOCUMENTS

| | | | |
|---|---|---|---|
| 2011/0303414 | A1 | 12/2011 | Seth et al. |
| 2011/0306524 | A1 | 12/2011 | Smith |
| 2012/0000708 | A1 | 1/2012 | van Zanten et al. |
| 2012/0018226 | A1 | 1/2012 | Nzeadibe et al. |
| 2012/0241155 | A1 | 9/2012 | Ali et al. |
| 2012/0329683 | A1 | 12/2012 | Droger et al. |
| 2013/0079256 | A1 | 3/2013 | Yang et al. |
| 2013/0092376 | A1 | 4/2013 | Al-Subhi et al. |
| 2013/0126243 | A1 | 5/2013 | Smith |
| 2013/0153232 | A1 | 6/2013 | Bobier et al. |
| 2013/0190543 | A1 | 7/2013 | Barnes et al. |
| 2013/0244913 | A1 | 9/2013 | Maberry et al. |
| 2013/0303410 | A1 | 11/2013 | Wagle et al. |
| 2013/0303411 | A1 | 11/2013 | Wagle et al. |
| 2014/0024560 | A1 | 1/2014 | Gonzalez Poche et al. |
| 2014/0024561 | A1 | 1/2014 | Reddy |
| 2014/0073540 | A1 | 3/2014 | Berry et al. |
| 2014/0102809 | A1 | 4/2014 | King et al. |
| 2014/0121135 | A1 | 5/2014 | Gamage et al. |
| 2014/0213489 | A1 | 7/2014 | Smith |
| 2014/0318785 | A1 | 10/2014 | Reddy et al. |
| 2014/0332212 | A1 | 11/2014 | Ayers et al. |
| 2015/0024975 | A1 | 1/2015 | Wagle et al. |
| 2015/0034389 | A1 | 2/2015 | Perez |
| 2015/0080273 | A1 | 3/2015 | Hatchman et al. |
| 2015/0087563 | A1 | 3/2015 | Brege et al. |
| 2015/0159073 | A1 | 6/2015 | Assmann et al. |
| 2015/0240142 | A1 | 8/2015 | Kefi et al. |
| 2015/0299552 | A1 | 10/2015 | Zamora et al. |
| 2016/0009981 | A1 | 1/2016 | Teklu et al. |
| 2016/0024370 | A1 | 1/2016 | Ba geri et al. |
| 2016/0069159 | A1 | 3/2016 | Teklu et al. |
| 2016/0090523 | A1 | 3/2016 | Ravi et al. |
| 2016/0177169 | A1* | 6/2016 | Zhang ............... C09K 8/52 507/261 |
| 2016/0186032 | A1 | 6/2016 | Yu et al. |
| 2016/0237340 | A1 | 8/2016 | Pandya et al. |
| 2016/0289529 | A1 | 10/2016 | Nguyen |
| 2017/0009125 | A1 | 1/2017 | Shaffer et al. |
| 2018/0223162 | A1 | 8/2018 | Al-Yami et al. |
| 2018/0265763 | A1* | 9/2018 | Leotaud ............... C09K 8/40 |

OTHER PUBLICATIONS

Notice of Allowance and Fee(s) Due dated Apr. 6, 2021 pertaining to U.S. Appl. No. 16/438,958, filed Jun. 12, 2019, 19 pgs.
Notice of Allowance and Fee(s) Due dated Apr. 6, 2021 pertaining to U.S. Appl. No. 16/439,006, filed Jun. 12, 2019, 19 pgs.
Notice of Allowance and Fee(s) Due dated Apr. 23, 2021 pertaining to U.S. Appl. No. 16/856,288, filed Apr. 23, 2020, 29 pgs.
Notice of Allowance and Fee(s) Due dated Apr. 14, 2021 pertaining to U.S. Appl. No. 16/735,073, filed Jan. 6, 2020, 40 pgs.
Notice of Allowance and Fee(s) Due dated Apr. 21, 2021 pertaining to U.S. Application No. 16/774,410, filed Jan. 28, 2020, 40 pgs.
Office Action pertaining to European Patent Application No. 18713071.1 dated Sep. 16, 2020.
Office Action pertaining to European Patent Application No. 18704814.5 dated Sep. 11, 2020.
Gokavarapu et al., "An Experimental Study of Aphron Based Drilling Fluids", 5th Saint Petersburg International Conference & Exhibition—Geosciences: Making the Most of the Earth's resources, Apr. 2-5, 2012.
Office Action dated Apr. 28, 2021 pertaining to U.S. Appl. No. 16/683,891, filed Nov. 14, 2019, 70 pgs.
Office Action dated Nov. 23, 2020 pertaining to European Patent Application No. 19191792.1 filed Jan. 25, 2018.
Notice of Allowance and Fee(s) due dated Jan. 25, 2021 pertaining to U.S. Appl. No. 16/298,243, filed Mar. 11, 2019, 23 pgs.
Notice of Allowance and Fee(s) due dated Jan. 26, 2021 pertaining to U.S. Appl. No. 16/298,211, filed Mar. 11, 2019, 23 pgs.
Chinese Office Action dated Dec. 7, 2020 pertaining to application No. 201880009774.7 filed Jan. 25, 2018.
Chinese Office Action dated Dec. 21, 2020 pertaining to application No. 201880009610.4 filed Feb. 1, 2018.
Notice of Allowance and Fee(s) Due dated Feb. 16, 2021 pertaining to U.S. Appl. No. 16/381,783, filed Apr. 11, 2019, 31 pgs.
Office Action pertaining to European Patent Application No. 18704368.2 dated Sep. 17, 2020.
Office Action pertaining to European Patent Application No. 18706032.2 dated Sep. 14, 2020.
Office Action pertaining to European Patent Application No. 18704130.6 dated Sep. 11, 2020.
Examination Report pertaining to GCC Patent Application No. 2018/38749 dated Jul. 10, 2020.
Datasheet of Barite by AMC Drilling Fluids and Products (Year: 2011).
Office Action dated Nov. 10, 2020 pertaining to U.S. Appl. No. 16/438,958, filed Jun. 12, 2019, 61 pgs.
Office Action dated Nov. 10, 2020 pertaining to U.S. Appl. No. 16/439,006, filed Jun. 12, 2019, 61 pgs.
Notice of Allowance and Fee(s) Due dated Nov. 16, 2020 pertaining to U.S. Appl. No. 16/653,357, filed Oct. 15, 2019, 19 pgs.
U.S. Office Action dated Aug. 5, 2021 pertaining to U.S. Appl. No. 16/683,891, filed Nov. 14, 2019, 13 pages.
U.S. Office Action dated Oct. 12, 2021 pertaining to U.S. Appl. No. 16/890,504, filed Jun. 2, 2020, 87 pages.
U.S. Notice of Allowance and Fee(s) Due dated Oct. 22, 2021 pertaining to U.S. Appl. No. 16/683,891, filed Nov. 14, 2019, 9 pages.

* cited by examiner

SPACER FLUIDS AND CEMENT SLURRIES THAT INCLUDE SURFACTANTS

CROSS REFERENCES TO RELATED APPLICATIONS

This application claims priority to U.S. Non-Provisional patent application Ser. No. 15/586,543 filed May 4, 2017, U.S. Provisional Patent Application Ser. No. 62/454,189 filed Feb. 3, 2017, and to U.S. Provisional Patent Application Ser. No. 62/454,192 filed Feb. 3, 2017, all of which are incorporated by reference herein in their entirety.

BACKGROUND

Technical Field

Embodiments of the present disclosure generally relate to natural resource well drilling and, more specifically, to spacer fluids and cement slurries utilized in well drilling processes.

Technical Background

There is a continual need for the discovery and extraction of subterranean fuel sources, such as oil or natural gas. Extracting subterranean fuel sources may require drilling a hole from the surface to the subterranean geological formation housing the fuel. Specialized drilling techniques and materials are utilized to form the bore hole and extract the fuels. Specialized material utilized in drilling operations include spacer fluid and cement slurry, which may be formulated for specific cementing conditions and processes

INDEX OF ABBREVIATED TERMS

In the present disclosure, the following terms or units of measurement have been abbreviated, where:
° F.=degrees Fahrenheit;
cP=centipose;
HLB=hydrophilic-lipophilic balance;
lb/100 ft$^2$=pounds per 100 cubic feet;
M=the molecular mass of the entire molecule in the Griffin Method calculation;
$M_h$=molecular mass of the hydrophilic portion of the molecule Griffin Method calculation;
min=minutes;
OBM=oil-based mud;
ppcf=pounds per cubic foot;
PV=plastic viscosity;
RPM=rotations per minute;
SOMB=synthetic oil-based mud:
wt. %=weight percent; and
YP=yield point.

SUMMARY

Well bores are commonly cemented, where the annulus between the tubular and the well bore wall is filled with cement. Prior to cementing, the well bore may be filled with an oil-based drilling fluid, sometimes referred to as drilling mud. To remove the drilling fluid, it may be displaced by the cement slurry, which enters the annulus, and is cured to cement. A spacer fluid may be utilized to separate the drilling fluid from the cement slurry, as the drilling fluid may be oil-based and the cement slurry may be water-based, such that their interaction would be detrimental to the cement slurry.

When cement slurries are water-based, they may form stronger bonds with water-wettable surfaces. Therefore, well bore sections contacted by non-aqueous drilling fluid (resulting in oil-wet surfaces) may exhibit poor cement bonding if this issue is not addressed. Poor cement bonding may lead to poor isolation and, consequently, to a buildup of unwanted casing-casing or tubing-casing annular pressure.

Accordingly, there is a need for spacer fluids which provide enhanced wettability for cement slurries on surfaces which were previously contacted by non-aqueous (for example, oil-based) fluids, such as some drilling fluids. Additionally, there is a need for cement slurries which provide enhanced wettability on surfaces which have been exposed to an oil-based drilling fluid.

It has been discovered that the use of surfactant in the spacer fluid, the cement slurry, or both, may aid in avoiding the cement bonding issues resulting from residual oil-based drilling fluids on surfaces which are contacted by the cement slurry. The surfactant may increase water wettability of surfaces such as the tubular or well bore wall, enhancing the bond with the water-based cement slurry.

Moreover, the use of a spacer fluid that includes the surfactants presently described in conjunction with the use of a cement slurry which includes the surfactants presently described may provide for enhanced cement formation in the well bore. It is believed that using a surfactant in both the spacer fluid and the cement slurry, according to surfactant embodiments presently described, will promote the water wettability of the encountered surfaces in a synergistic manner. Specifically, the spacer fluid has the potential to be contaminated by the oil-based drilling fluid as they may be in direct contact. This potential contamination may reduce the efficiency of the wettability alteration of the spacer fluid. However, since the cement slurry composition is never in contact with the bulk portion of the oil-based drilling fluid, having a surfactant that can perform water wettability alteration while being compatible in both the spacer fluid and the cement slurry composition may promotes water wettability while not causing changes in the compositions of the cement slurry and spacer fluid by intermixing. For example, utilizing the same or similar surfactant in the cement slurry and spacer fluid may enhance water wettability while allowing the cement slurry to maintain its compositional characteristics with respect to surfactants (that is, surfactants from the spacer fluid which intermix with the cement slurry may not affect the properties of the resulting cement formed from the cement slurry). Thus, the use of the surfactants described presently in the cement slurry and spacer fluid not only enhance wettability by the utilization of more total surfactant, but may also improve the cementing by not substantially changing the surfactant composition of the cement slurry by intermixing with the spacer fluid. The surfactants described presently may be suitable in both the spacer fluid and the cement slurry, allowing for these synergistic effects.

The presently disclosed spacer fluids typically include at least a base fluid, a weighting agent, a viscosifier, and a surfactant. In some embodiments, one role of the surfactant in the presently disclosed spacer fluid formulation is to improve mud removal and ensure the encountered surfaces are left water wet. The presently disclosed embodiments may provide spacer fluids that may improve water wettability by the inclusion of an ethoxylated alcohol surfactant. In additional embodiments, cement slurries are described which may comprise water, a cement precursor, and a surfactant. The surfactant of the spacer fluid may be different from the surfactant of the cement slurry. Alternatively, the spacer fluid and the surfactant may include the same surfactant. In additional embodiments, the cement slurry, the spacer fluid, or both, may contain multiple surfactants in a surfactant package.

In one embodiment, the spacer fluid, the cement slurry, or both, may include an ethoxylated alcohol having the formula R—$(OCH_2CH_2)_x$—OH, where R is a hydrocarbyl group, and x may be from 1 to 20. According to additional embodiments, the surfactant may have a hydrophilic-lipophilic balance (HLB) of from 10 to 16.

In one embodiment, a well bore cementing system may comprise a spacer fluid and a cement slurry. The spacer fluid may be positioned within a well bore, and the spacer fluid may comprise a first surfactant package comprising one or more surfactants. The first surfactant package may comprise a first surfactant having the chemical structure R1—$(OC_2H_4)_{x1}$—OH, where R1 is a hydrocarbyl group having from 5 to 20 carbon atoms, and x1 is an integer from 5 to 15. The cement slurry may be positioned within the well bore, and the cement slurry may comprise a second surfactant package comprising one or more surfactants. The second surfactant package may comprise a second surfactant having the chemical structure R2—$(OC_2H_4)_{x2}$—OH, where R2 is a hydrocarbyl group having from 5 to 20 carbon atoms, and x2 is an integer from 5 to 15.

According to another embodiment, a method for cementing a well bore may comprise introducing a spacer fluid into the well bore such that at least a portion of a drilling fluid positioned in the well bore is displaced by the spacer fluid and introducing a cement slurry into the well bore such that at least a portion of the spacer fluid is displaced by the cement slurry. The spacer fluid may comprise a first surfactant package comprising one or more surfactants. The first surfactant package may comprise a first surfactant having the chemical structure R1—$(OC_2H_4)_{x1}$—OH, where R1 is a hydrocarbyl group having from 5 to 20 carbon atoms, and x1 is an integer from 5 to 15. The cement slurry may comprise a second surfactant package comprising one or more surfactants. The second surfactant package may comprise a second surfactant having the chemical structure R2—$(OC_2H_4)_{x2}$—OH, where R2 is a hydrocarbyl group having from 5 to 20 carbon atoms, and x2 is an integer from 5 to 15.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

Embodiments of the present disclosure are directed to spacer fluids and cement slurries, and methods of making and using spacer fluids and cement slurries that have, among other attributes, improved water wettability of surfaces contacted by an oil-based fluid, such as an oil-based drilling fluid. As used throughout the disclosure, "spacer fluid" refers to a fluid utilized to space any two other materials utilized in well production. A "cement slurry" refers to a slurry which is cured to form a cement. For example, a spacer fluid may be utilized to separate a cement slurry from drilling fluid. In some embodiments, one or more of the spacer fluid and the cement slurry of the present disclosure may contain a surfactant, such as an ethoxylated fatty acid. According to one or more embodiments, the spacer fluid and the cement slurry include a surfactant that is an ethoxylated alcohol compound having the chemical formula R—$(OCH_2CH_2)_x$—OH, where R is a saturated or unsaturated, linear or branched hydrocarbyl group, and x is equal to the number of ethoxy moieties present in the compound. The surfactants of the spacer fluid and cement slurry may be different, but may each be in accordance with the chemical structure R—$(OCH_2CH_2)_x$—OH. According to one or more embodiments, the surfactant may have a hydrophilic-lipophilic balance (HLB) of from 12 to 13.5, such as approximately 12.75. For example, according to one embodiment, the spacer fluid, cement slurry, or both, include the surfactant R—$(OC_2H_4)_8$—OH, where R is an iso-tridecyl group.

A well bore is a hole that extends from the surface to a location below the surface. The well bore can permit access as a pathway between the surface and a hydrocarbon-bearing formation. The well bore, defined and bound along its operative length by a well bore wall, extends from a proximate end at the surface, through the subsurface, and into the hydrocarbon-bearing formation, where it terminates at a distal well bore face. The well bore forms a pathway capable of permitting both fluid and apparatus to traverse between the surface and the hydrocarbon-bearing formation.

Besides defining the void volume of the well bore, the well bore wall also acts as the interface through which fluid can transition between the interior of the well bore and the formations through which the well bore traverses. The well bore wall can be unlined (that is, bare rock or formation) to permit such interaction with the formation or lined (that is, with casing, tubing, production liner or cement) so as to not permit such interactions.

The well bore usually contains at least a portion of at least one tubular (that is, a fluid conduit) that links the interior of the well bore to the surface. Examples of such fluid conduits or tubulars include casing liners, pipes, tubes, coiled tubing and mechanical structures with interior voids. A fluid conduit connected to the surface is capable of permitting regulated fluid flow and access between equipment on the surface and the interior of the well bore. Example equipment connected at the surface to the fluid conduit includes pipelines, tanks, pumps, compressors and flares. The fluid conduit is sometimes large enough to permit introduction and removal of mechanical devices, including tools, drill strings, sensors and instruments, into and out of the interior of the well bore.

The fluid conduit made from a tubular usually has at least two openings (typically on opposing ends) with an enclosing surface having an interior and exterior surface. The interior surface acts to define the bounds of the fluid conduit. Examples of tubulars and portions of tubulars used in the well bore as fluid conduits or for making or extending fluid conduits include casing, production liners, coiled tubing, pipe segments and pipe strings. An assembly of several smaller tubulars connected to one another, such as joined pipe segments or casing, can form a tubular that acts as a fluid conduit.

When positioning a tubular or a portion of tubular in the well bore, the volume between the exterior surfaces of the fluid conduit or tubular portion and the well bore wall of the well bore forms and defines a well bore annulus. The well bore annulus has a volume in between the external surface of the tubular or fluid conduit and the well bore wall.

The well bore contains well bore fluid from the first moment of formation until completion and production. The well bore fluid serves several purposes, including well control (hydraulic pressure against the fluids in the hydrocarbon-bearing formation), well bore wall integrity (hydraulic pressure on the well bore wall; provides loss control additives) and lubricity (operating machinery). Well bore fluid is in fluid contact with all portions of and everything in the well bore not fluidly isolated, including the tubular internal fluid conduit, the well bore annulus and the well bore wall. Other fluid conduits coupled to the well bore often contain at least some well bore fluid.

While drilling, drilling fluid ("mud") fills the interior of the well bore as the well bore fluid. Some muds are petroleum-based materials and some are water-based materials. Petroleum-based materials comprise at least 90 weight percent of an oil-based mud (1M). Examples of suitable base petroleum materials include crude oils, distilled fractions of crude oil, including diesel oil, kerosene and mineral oil, and heavy petroleum refinery liquid residues. A minor part of the OBM is typically water or an aqueous solution that resides internally in the continuous petroleum phase. Other ODM components can include emulsifiers, wetting agents and other additives that give desirable physical properties.

Oil-based muds also include synthetic oil-based muds (SOBMs). Synthetic oil-based muds are crude oil derivatives that have been chemically treated, altered and/or refined to enhance certain chemical or physical properties. In comparison to a crude temperature fraction of a partially-refined crude oil, which may contain several classes (for example, alkane, aromatic, sulfur-bearing, nitrogen-bearing) of thousands of individual compounds, a SOBM can comprise one class with only tens of individual compounds (for example, esters compounds in a $C_{8-14}$ range). Examples of materials used as base fluids for SOBMs include linear alpha olefins, isomerized olefins, poly alpha olefins, linear alkyl benzenes and vegetable and hydrocarbon-derived ester compounds. SOBMs are monolithic systems that behave in a manner as if they were an oil-based mud but provide a more narrow and predictable range of chemical and physical behaviors.

While performing drilling operations, well bore fluid circulates between the surface and the well bore interior through fluid conduits Well bore fluid also circulates around the interior of the well bore. The introduction of drilling fluid into the well bore through a first fluid conduit at pressure induces the motivation for the fluid flow in the well bore fluid. Displacing well bore fluid through a second fluid conduit connected to the surface causes well bore fluid circulation from the first fluid conduit to the second fluid conduit in the interior of the ell bore. The expected amount of well bore fluid displaced and returned to the surface through the second fluid conduit is equivalent to the amount introduced into the well bore through the first fluid conduit. Parts of the well bore that are fluidly isolated do not support circulation.

Drilling muds that are not water based tend to dehydrate and lose additives during drilling operations. Dehydrated and additive-poor residues can collect in lower-flow velocity parts as solids, gels and highly viscous fluids. "Filter cake" is a layer of deposited solids and gelled drilling fluid that adheres to the interior surfaces of the well bore, including the well bore wall and the exterior of the fluid conduit.

Cementing is one of the most important operations in both drilling and completion of the well bore. Primary cementing occurs at least once to secure a portion of the fluid conduit between the well bore interior and the surface to the well bore wall of the well bore.

Primary cementing forms a protective solid sheath around the exterior surface of the introduced fluid conduit by positioning cement slurry in the well bore annulus. Upon positioning the fluid conduit in a desirable location in the well bore, introducing cement slurry into the well bore fills at least a portion if not all of the well bore annulus. When the cement slurry cures, the cement physically and chemically bonds with both the exterior surface of the fluid conduit and the well bore wall, coupling the two. In addition, the solid cement provides a physical barrier that prohibits gases and liquids from migrating from one side of the solid cement to the other via the well bore annulus. This fluid isolation does not permit fluid migration uphole of the solid cement through the well bore annulus.

Displacing well bore fluid for primary cementing operations is similar to establishing circulation in the well bore fluid with a drilling mud. An amount of cement slurry introduced into the well bore through a first fluid conduit induces fluid flow in the well bore and displaces an equivalent amount of well bore fluid to the surface through a second fluid conduit. In such an instance, the well bore fluid includes a portion of the well bore fluid previously contained in the well bore before cement introduction as well as the amount of the introduced cement slurry.

Cementing in the presence of filter cake can cause a cementing job to fail. The adhesion of filter cake and celled fluid to the well bore wall or the tubular exterior is weak compared to the bond that cement can make Cementing on top of filter cake strips the cake off the walls and exterior surfaces due to the weight of the cement upon curing. This lack of direct adhesion creates fluid gaps in and permits circulation through the well bore annulus.

Direct contact between the water-based cement slurry and the oil-based drilling mud can result in detrimental fluid interactions that can jeopardize not only cementing operations but also the integrity of the well bore. The intermingling of incompatible fluids can create emulsions (both water-in-oil and oil-in-water emulsions) between the fluids. The emulsions, which resist fluid movement upon the application of force, raises the viscosity profile of the well bore fluid Increasing pumping head pressure to maintain a constant fluid circulation rate in the well bore can result in damaging the formation downhole as well bore fluid pressure exceeds the fracture gradient of the formation.

Besides detrimentally affecting the viscosity profile, when solids and water from the cement slurry transfer into the oil-based drilling mud during emulsification, the oil-based mud properties are detrimentally affected. Dilution, chemical interaction, breaking of a water-in-oil emulsion and flocculation of suspended additives out of the oil phase can also occur.

Cement slurry properties can also suffer from contamination by the OBM Flocculation of weighting agents and macromolecules can cause the cement to have reduced compressive strength. The diffusion of ionic species from the OBM can cause premature setting of the cement slurry. The ramifications of early cement hardening include equipment damage, time delay, well bore damage and possible loss of the entire tubular string Contamination of the cement slurry with bulk OBM results in higher slurry viscosity and higher fluid losses from the hardening slurry.

Without being bound by theory, it is believed that the spacer fluids and cement slurries presently disclosed may have a beneficial effect with respect to one or more of the problems with cementing processes described. As previously described in the present description, the spacer fluid may comprise one or more of a base fluid, a surfactant package, a weighing agent, and a viscosifier. It should be understood that while embodiments of spacer fluids presently described include these components, other components may be included in a spacer fluid for various functional reasons, and it is contemplated that additional components may be included in the spacer fluids presently described. A cement slurry may include water and a cement precursor, in addition to a surfactant package. As used in this disclosure, a "surfactant package" refers to the group of one or more surfactant species which are included in the spacer fluid or cement slurry. For example, a surfactant package may include a single chemical species, or may alternatively include more than one chemical species. As should be appreciated, in the case of an ethoxylated alcohol, the degree of ethoxylation may vary from molecule to molecule by a standardized distribution, where some molecules include fewer than the desired number of ethoxy groups and some molecules include more than the desired number of ethoxy groups.

According to one or more embodiments, the surfactant of the cement slurry, the spacer fluid, or both, may have the chemical structure of Chemical Formula 1:

$$R\text{---}(OC_2H_4)_x\text{---}OH \quad \text{Chemical Formula 1}$$

in which R is a hydrocarbyl group having from 5 to 20 carbon atoms, and x is an integer from 5 to 15. As used in this disclosure, a "hydrocarbyl group" refers to a chemical group consisting of carbon and hydrogen. Typically, a hydrocarbyl group may be analogous to a hydrocarbon molecule with a single missing hydrogen (where the hydrocarbyl group is connected to another chemical group). An example spacer fluid composition incorporating the ethoxylated alcohol compound may include a base fluid, a weighting agent, a viscosifier, and a surfactant.

It should be understood that, as used throughout this disclosure, a surfactant or surfactant package may refer to the surfactant or surfactant package included in the spacer fluid or the surfactant included in the cement. The surfactant or surfactant of the spacer fluid may be different or identical to that of the cement slurry. Additionally, it should be understood that in the disclosure and appended claims, R and x in Chemical formula 1 may be represented by R1 and R2, and x1 and x2, respectively, referring to a surfactant structure present in the spacer fluid (by R1 and x1) and to the surfactant structure present in the cement slurry (by R2 and x2). For example, the surfactant of the spacer fluid may be represented by R1-$(OC_2H_4)_{x1}$—OH and the surfactant of the cement slurry may be represented by R2-$(OC_2H_4)_{x2}$—OH. However, it should be understood that any description of R or x in the present disclosure may refer to R1 or R2, or x1 or x2, respectively.

In one or more embodiments, the surfactant package may comprise an ethoxylated alcohol compound having the chemical formula R—$(OCH_2CH_2)_8$—OH, where R is a saturated or unsaturated, linear or branched hydrocarbyl group having from 12 to 14 carbon atoms.

As shown in Chemical Formula 1, x indicates the number of ethoxy groups included in the surfactant molecule. In some embodiments, x may be one of 1, 2, 3, 4, 5, 6, 7, 8, 9, 10, 11, 12, 13, 14, or 15. In some embodiments, x may be an integer from 5 to 10, from 5 to 9, from 7 to 10, or from 7 to 9. In some embodiments, x may be an integer greater than or equal to 5, such as an integer greater than or equal to 7, or greater than or equal to 8.

In Chemical Formula 1, R may be hydrocarbyl group, such as an alkyl, alkenyl, alkynyl, or cyclic hydrocarbyl group, such as a phenyl group. R may also contain saturated or unsaturated carbon atoms in a straight, branched, aliphatic or aromatic, both aliphatic and aromatic, or combinations of any of these configurations. In one or more embodiments, R may include from 5 to 20 carbons, such as from 5 to 18 carbons, from 5 to 16 carbons, from 5 to 14 carbons, from 5 to 12 carbons, from 5 to 10 carbons, from 5 to 8 carbons, from 5 to 6 carbons, or from 12 to 20 carbons, from 7 to 20 carbons, from 9 to 20 carbons, from 11 to 20 carbons, from 13 to 20 carbons, from 15 to 20 carbons, from 17 to 20 carbons, from 10 to 15 carbons, from 12 to 14 carbons, or 13 carbons. In some embodiments, R may be an alkyl or alkenyl group having from 10 to 15 carbon atoms. In some embodiments, R may be $C_{13}H_{27}$ (such as a branched tridecyl group).

In some embodiments, the compound in the surfactant may be amphiphilic, meaning that it has a hydrophobic tail (that is, a non-polar R group) and a hydrophilic head (the polar ethoxy and alcohol groups) that may lower the surface tension between two liquids or between a liquid.

According to one embodiment, the R group may be an iso-tridecyl group ($C_{13}H_{27}$), as depicted in Chemical Structure A. It should be understood that Chemical Structure A depicts an embodiment of the surfactant of Chemical Formula 1 where the R group is an iso-tridecyl group. According to another embodiment, Chemical Structure A may have 8 ethoxy groups (that is, x equals 8 in Chemical Structure A).

Chemical Structure A

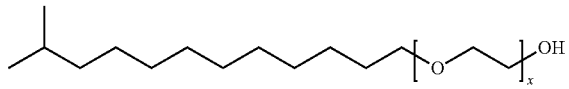

In some embodiments, the surfactant may be amphiphilic, and may have a hydrophilic-lipophilic balance (HLB) of from 11 to 13.5. As used in this disclosure, the HLB of the compound is the measure of the degree to which it is hydrophilic or lipophilic, which may be determined by the Griffin Method calculation, as shown in Equation 1:

$$HLB = 20 \times \frac{M_h}{M} \quad \text{Equation 1}$$

in which $M_h$ is the molecular mass of the hydrophilic portion of the molecule and M is the molecular mass of the entire molecule. The resulting HLB value provides a result on a scale of from 0 to 20 in which a value of 0 indicates to a completely hydrophobic/lipophilic molecule and a value of 20 corresponds to a completely hydrophilic/lipophobic molecule. Generally, a molecule having an HLB of less than 10 is lipid-soluble (and thus water-insoluble) and a molecule having an HLB of greater than 10 is water-soluble (and thus lipid-insoluble).

In one or more embodiments, the ethoxylated alcohol compound may be a reaction product of a fatty alcohol ethoxylated with ethylene oxide. Generally, the molar ratio of the fatty alcohol to the ethylene oxide may be utilized to control the level of ethoxylation. In one or more embodiments, the surfactant consists essentially of the reaction product of the fatty alcohol ethoxylated with ethylene oxide at a 8:1 molar ratio of the fatty alcohol to the ethylene oxide.

In one or more embodiments, the ethoxylated alcohol compound may be made by reacting the fatty alcohol with ethylene oxide at a x:1 molar ratio of the fatty alcohol to the ethylene oxide, as shown in Chemical Formula 2. Ethylene oxide is a cyclic ether having the chemical formula $C_2H_4O$ and may be produced through oxidation of ethylene in the presence of a silver catalyst. The ethoxylation reaction may be conducted at an elevated temperature and in the presence of an anionic catalyst, such as potassium hydroxide (KOH) for example. The ethoxylation reaction proceeds according to the following Chemical Formula 2.

Chemical Formula 2

In Chemical Formula 2, R is the hydrocarbon portion of the fatty alcohol previously described in this disclosure. As shown in Chemical Formula 2, the reaction product may have the general chemical formula R—$(OCH_2CH_2)_x$—OH, where R is a saturated or unsaturated, linear or branched hydrocarbyl group having from 5 to 20 carbon atoms.

According to some embodiments, the fatty alcohols used as the reactant to make the ethoxylated alcohol compound include alcohols having formula R—OH, in which R is a saturated or unsaturated, linear, or branched hydrocarbyl group. In one or more embodiments, R may be a saturated linear hydrocarbyl group. Alternatively, the fatty alcohol may include R that is a branched hydrocarbyl group. The fatty alcohol may be a naturally-occurring fatty alcohol, such as a fatty alcohol obtained from natural sources such as animal fats or vegetable oils. The fatty alcohol may also be a hydrogenated naturally-occurring unsaturated fatty alcohol. Alternatively, the fatty alcohol may be a synthetic fatty alcohol prepared from a petroleum source or other source through one or more synthesis reactions. Non-limiting examples of fatty alcohols may include, but are not limited to capryl alcohol, perlargonic alcohol, decanol (decyl alcohol), undecanol, dodecanol (lauryl alcohol), tridecanol (tridecyl alcohol), myristyl alcohol (1-tetradecanol), pentadecanol (pentadecyl alcohol), cetyl alcohol, palmitoeyl alcohol (cis-9-hexadecenol), heptadecanol (heptadecyl alcohol), stearyl alcohol, nonadecyl alcohol, arachidyl alcohol, other naturally-occurring fatty alcohols, other synthetic fatty alcohols, or combinations of any of these fatty alcohols. In examples, the fatty alcohol may be produced through oligomerization of ethylene derived from a petroleum source, or in other examples, the fatty alcohol may be produced through hydroformylation of alkenes followed by hydrogenation of the hydroformylation reaction product. In one or more embodiments, the fatty alcohol may include a hydrocarbon chain (R) having 13 carbon atoms. Some example ethoxylated alcohol compounds may be made using a saturated linear fatty alcohol having a saturated linear hydrocarbyl group R with 13 carbon atoms.

As described previously, the spacer fluid may include a base fluid. The base fluid of the spacer fluid composition may be an aqueous-based fluid, and can include deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. Fresh water may be preferable because of potential issues with introducing unnecessary amounts of ions, metals and minerals to cement slurry compositions that are more sensitive to such materials.

The spacer fluid composition may additionally include one or more viscosifiers. The viscosifier induces rheological properties (that is, thickening) in the spacer fluid composition that supports particle suspension and helps to prevent losses into the other fluids or the formation. The viscosifier can include biological polymers, clays, ethoxylated alcohols and polyether glycols. Biological polymers and their derivatives include polysaccharides, including xanthan gums, welan gums, guar gums, cellulose gums, corn, potato, wheat, maize, rice, cassava, and other food starches, succinoglycan, carrageenan, and scleroglucan and other intracellular, structural and extracellular polysaccharides. Biological polymers also include chemically modified derivatives such as carboxymethyl cellulose, polyanionic cellulose and hydroxyethyl cellulose (HEC) and forms of the polymers suspended in solvents. Clays and their derivatives include bentonite, sepiolite, attapulgite, and montmorillionite. Polyalklyene glycols include polyethylene glycols and polypropylene glycols, which are macromolecules with a series of internal ether linkages. Polyalklyene glycols are capable of dissolving in water and have a greater impact on viscosity with higher molecular weight.

The viscosifier can also include a viscosity thinner. A viscosity thinner reduces flow resistance and gel development by reducing viscosity of the spacer fluid. Thinners can reduce the flow resistance and gel development of filter cake and disrupt gelled materials that the spacer fluid composition contacts in the well bore. Thinners comprising large molecular structures can also act as fluid loss additives. The functional groups of the viscosity thinners can act to emulsify oils and hydrocarbons present in the aqueous phase. Chemically modified viscosity thinners can attract solids and particles in the spacer fluid and disperse such particles, the dispersion of particles preventing any increase in viscosity of the spacer fluid due to aggregation. Ionic thinners can counter-act the effects of cement slurry intrusion into the aqueous spacer. Cement intrusion in the spacer fluid composition can result in greater saline concentration or higher pH, which in turn can cause the gel strength or the yield point value, or both, of the spacer fluid to rise. Low gel strength and yield point values are preferred to maintain lower spacer fluid pumping pressure.

Polyphenoics, which include tannins, lignins, and humic acids, and chemically modified polyphenolics are useful viscosity thinners. Tannins and their chemically modified derivatives can either originate from plants or be synthetic. Examples of plant-originating tannins include tannins from pine, redwood, oak, and quebracho trees and bark; grapes and blueberries; and walnuts and chestnuts.

Chemically modified tannins include sulfomethylated and other sulfoalkylated tannins, causticized tannins, sulfated tannins, sodium-complexed tannin and sulfomethylated quebracho. Chemically modified lignins include sodium lignosulfonates, sugar-containing lignosulfonates, and de-sugared lignosulfonates. Humic acids, such as those extracted from decaying tree bark, are also useful rheology modifiers. Useful polyphenoics dissolve in the base aqueous fluid. In some instances, the chemically modified tannin pairs with similar ionic specie to assist in dissolving the tannin in the aqueous solution. For example, sulfomethylated tannins paired with ferrous sulfates are soluble in aqueous solutions.

The spacer fluid composition may also include one or more weighting agents. The weighting agent provides the spacer fluid with the proper density profile to separate the fluids from one another. The proper weighing of the spacer fluid composition relative to each fluid ensures that the spacer fluid composition does not "invert" with one of the other fluids present in the well bore. Weighting agents include sand, barite (barium sulfate), hematite, fly ash, silica sand, ilmenite, manganese oxide, manganese tetraoxide, zinc oxide, zirconium oxide, iron oxide and fly ash. According to one embodiment, the weighting agent for the spacer fluid composition is barite. Embodiments of the spacer fluid composition include compositions not including calcium carbonate as the weighting agent.

The density profile of the spacer fluid composition relative to the other fluids may be such that the spacer fluid composition has a similar or greater density than the displaced fluid but has a lower density than the displacing fluid. In some instances, the displaced fluid is the oil-based mud and the displacing fluid is the water-based cement slurry. The higher density spacer fluid composition pushes gelled and solid remnants of the displaced fluid away from the well bore wall and fluid conduit exteriors.

The spacer fluid composition may have a density in the range of from 70 ppcf to 120 ppcf, such as from 80 ppcf to 90 ppcf. However, one of ordinary skill in the art should recognize that spacer fluids can have a density at any value within this range given the application circumstances and therefore understands that all values within the provided range are included.

The spacer fluid composition forms by combining one or more of the base fluid, the viscosifier, the weighting agent, the surfactant package. An example method of combining the spacer fluid components includes introducing into a vessel capable of retaining the spacer fluid composition a sufficient quantity of base aqueous fluid. Introducing each component into the base aqueous fluid separately and mixing the blend such that all the spacer fluid components are fully incorporated forms the spacer fluid composition. Blending means can include mixing using a low- or high-shear blender.

According to one or more embodiments, the various components of the spacer fluid may be present in the spacer fluid in amounts relative to the base fluid. In various embodiments, the weight ratio of base fluid to surfactant may be from 100:1 to 100:20, such as from 100:1 to 100:5, or from 100:7 to 100:10. In additional embodiments, the weight ratio of base fluid to a particular surfactant composition (such as any of those presently disclosed) may be from 100:1 to 100:10, such as from 100:1 to 100:5, or from 100:7 to 100:20. According to additional embodiments, the weight ratio of base fluid to viscosifier may be from 100:0.05 to 100:7, such as from 100:0.05 to 100:0.1, or from 100:4 to 100:5. In additional embodiments, the weight ratio of base fluid to the weighting agent may be from 100:3 to 100:350, such as from 100:60 to 100:90, or from 100:100 to 100:150. While some example compositional ranges have been disclosed for the base fluid, the surfactant, the viscosifier, and the weighting agent, it should be appreciated that one of ordinary skill in the art would recognize the appropriate amount of various components for the spacer fluid composition presently described for one or more embodiments. Additionally, it should be understood that any compositional ranges supplied in this disclosure should be interpreted to mean that a combination of materials which fits into a particular class, such as a weighting agent, is in the composition range disclosed, or that any single component of a particular class has the disclosed compositional range.

The cement slurry of the present disclosure may include water, a cement precursor material, and a surfactant. Without being bound by any particular theory, use of the surfactant along with the cement precursor material in some embodiments may provide reduced viscosity of the cement slurry to allow for easier processing, flowability, and handling of the cement slurry in various applications. In some embodiments, use of the surfactant along with the cement precursor material may provide reduced water content in the cement slurry and, in some embodiments, may reduce the friction pressure of the cement slurry to aid in drying and curing the cement slurry. In some embodiments, use of the surfactant along with the cement precursor material may additionally improve efficacy and performance of other optional additives, such as fluid loss additives.

The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the cement slurry of the present disclosure. While hydraulic cement may be more commonly utilized in drilling applications, it should be understood that other cements are contemplated. In some embodiments, the cement precursor material may be Portland cement precursor. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulphate as an inter ground addition.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, calcium alluminate, other similar compounds, and combinations of these. The cement precursor material may include Portland cement, siliceous fly ash, calcareous fly ash, slag cement, silica fume, any known cement precursor material or combinations of any of these.

In some embodiments, the cement slurry may contain from 10 wt. % to 90 wt. % of the cement precursor material based on the total weight of the cement slurry. For instance, the cement slurry may contain from 10 wt. % to 80 wt. %, from 10 wt. % to 70 wt. %, from 10 wt. % to 60 wt. %, or from 10 wt. % to 50 wt. % of the cement precursor material. The cement slurry may contain from 10 wt. % to 40 wt. %, from 10 wt. % to 30 wt. %, from 20 wt. % to 90 wt. %, or from 20 wt. % to 80 wt. % of the cement precursor material. In some embodiments, the cement slurry may contain from 20 wt. % to 60 wt. %, from 20 wt. % to 50 wt. %, from 20 wt. % to 40 wt. %, from 30 wt. % to 90 wt. %, or from 30 wt. % to 80 wt. % of the cement precursor material. The cement slurry may contain from 30 wt. % to 60 wt. %, from 30 wt. % to 50 wt. %, from 40 wt. % to 90 wt. %, from 40 wt. % to 60 wt. %, from 50 wt. % to 90 wt. %, from 50 wt. % to 80 wt. %, from 60 wt. % to 90 wt. %, or from 60 wt. % to 80 wt. % of the cement precursor material.

Water may be added to the cement precursor material to produce the slurry. The water may be distilled water, deionized water, or tap water. In some embodiments, the water may contain additives or contaminants. For instance, the water may include freshwater or seawater, natural or synthetic brine, or salt water. In some embodiments, salt or other organic compounds may be incorporated into the water to control certain properties of the water, and thus the cement slurry, such as density. Without being bound by any particular theory, increasing the saturation of water by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the cement slurry may contain from 5 wt. % to 70 wt. % water based on the total weight of the cement slurry. In some embodiments, the cement slurry may contain from 5 wt. % to 50 wt. %, from about 5 wt. % 30 wt. %, 5 wt. % to 20 wt. %, from 5 wt. % to 10 wt. %, or from 10 wt. % to 70 wt. %, from 30 wt. % to 70 wt. %, or from 50 wt. % to 70 wt. % of water. The cement slurry may contain from 20 wt. % to 40 wt. %, or from 25 wt. % to 35 wt. %, such as 30 wt. % of water based on the total weight of the cement slurry.

The cement slurry may contain from 0.1 wt. % to 10 wt. % of the surfactant based on the total weight of the cement slurry. For instance, the cement slurry may contain from 0.1 wt. % to 8 wt. % of the surfactant, from 0.1 wt. % to 5 wt. % of the surfactant, or from 0.1 wt. % to 3 wt. % of the surfactant. The cement slurry may contain from 1 wt. % to 10 wt. %, from 1 wt. % to 8 wt. %, from 1 wt. % to 5 wt. %, or from 1 wt. % to 3 wt. % of the surfactant. In some embodiments, the cement slurry may contain from 3 wt. % to 5 wt. %, from 3 wt. % to 8 wt. %, from 3 wt. % to 10 wt. %, or from 5 wt. % to 10 wt. % of the surfactant.

In some embodiments, the cement slurry may contain from 0.1 wt. % to 50 wt. % of the one or more additives based on the total weight of the cement slurry. For instance, the cement slurry may contain from 0.1 wt. % to 8 wt. % of the one or more additives, from 0.1 wt. % to 5 wt. % of the one or more additives, or from 0.1 wt. % to 3 wt. % of the one or more additives. The cement slurry may contain from 1 wt. % to 10 wt. % of the one or more additives, from 1 wt. % to 8 wt. %, from 1 wt. % to 5 wt. %, or from 1 wt. % to 3 wt. % of the one or more additives. In some embodiments, the cement slurry may contain from 3 wt. % to 5 wt. %, from 3 wt. % to 8 wt. %, from 3 wt. % to 10 wt. %, or from 5 wt. % to 10 wt. % of the one or more additives.

In some embodiments, the one or more additives may include a dispersant containing one or more anionic groups. For instance, the dispersant may include synthetic sulfonated polymers, lignosulfonates with carboxylate groups, organic acids, hydroxylated sugars, other anionic groups, or combinations of any of these. Without being bound by any particular theory, in some embodiments, the anionic groups on the dispersant may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of turbulence at lower pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may be an anionic synthetic polymer, such as 2-acrylamido-2-methylpropane sulfonic acid (AMPS) or AMPS-copolymers, including lattices of AMPS-copolymers. In some embodiments, the fluid loss additive may include bentonite, which may additionally viscosify the cement slurry and may, in some embodiments, cause retardation effects. Without being bound by any particular theory, the surfactant may reduce the surface tension of the aqueous phase of the cement slurry, thus reducing the fluid lost by the slurry. Additionally, the carboxylic acid may further reduce the fluid loss of the cement slurry by plugging the pores of the cement filter cake, minimizing space for the water or other fluids to escape from the cement.

In some embodiments, the fluid loss additive may contain a carboxylic fatty acid having from 16 to 18 carbon atoms, which may be used in combination with the surfactant to reduce fluid loss in the cement slurry. The carboxylic fatty acid includes any acids having formula ROOH in which R is a saturated or unsaturated, linear, or branched hydrocarbyl group having from 16 to 18 carbons, such as a hydrocarbyl group having 16 carbons, 17 carbons, or 18 carbons. Examples of suitable carboxylic fatty acids include palmitic acid, palmitoleic acid, vaccenic acid, oleic acid, elaidic acid, linoleic acid, $\alpha$-linolenic acid, $\gamma$-linolenic acid, stearidonic acid, and combinations thereof. The surfactant may be in accordance with any of the embodiments previously described. In some specific embodiments, the fluid loss additive may contain a combination of an ethylene oxide condensate of branched isotridecyl alcohol with a fatty acid having from 16 to 18 carbon atoms in the hydrocarbyl group.

In some embodiments, the cement slurry may contain from 0.1 wt. % to 10 wt. % of one or more fluid loss additives, the one or more dispersants, or both. For instance, the cement slurry may contain from 0.1 wt. % to 10 wt. %, or from 1 wt. % to 10 wt. % of the one or more fluid loss additives. The cement slurry may contain from 1 wt. % to 8 wt. %, from 1 wt. % to 5 wt. %, from 1 wt. % to 3 wt. %, from 3 wt. % to 5 wt. %, or from 3 wt. % to 10 wt. % of the one or more fluid loss additives. Likewise, the cement slurry may contain from 0.1 wt. % to 10 wt. %, or from 1 wt. % to 10 wt. % of the one or more dispersants. The cement slurry may contain from 1 wt. % to 8 wt. %, from 1 wt. % to 5 wt. %, from 1 wt. % to 3 wt. %, from 3 wt. % to 5 wt. %, or from 3 wt. % to 10 wt. % of the one or more dispersants. In some embodiments, the cement slurry may contain from 0.1 wt. % to 10 wt. %, or from 1 wt. % to 10 wt. % of the combined total of fluid loss additives and dispersants. The cement slurry may contain from 1 wt. % to 8 wt. %, from 1 wt. % to 5 wt. %, from 1 wt. % to 3 wt. %, from 3 wt. % to 5 wt. %, or from 3 wt. % to 10 wt. % of the combined total of fluid loss additives and dispersants.

Following introduction of the cement slurry into the well bore, the cement slurry may form cement through curing. As used throughout the disclosure, "curing" refers to providing adequate moisture, temperature and time to allow the concrete to achieve the desired properties (such as hardness) for its intended use through one or more reactions between the water and the cement precursor material. Curing may be a passive step where no physical action is needed (such as cement that cures in ambient conditions when untouched). In contrast, "drying" refers to merely allowing the concrete to achieve a moisture condition appropriate for its intended use, which may only involve physical state changes, as opposed to chemical reactions. In some embodiments, curing the cement slurry may refer to passively allowing time to pass under suitable conditions upon which the cement slurry may harden or cure through allowing one or more reactions between the water and the cement precursor material. Suitable conditions may be any time, temperature, pressure, humidity, and other appropriate conditions known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the water and the cement precursor, a combination of these, or other such means.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., or greater than or equal to 120° F. The cement slurry may be cured at temperatures of from 50° F. to 250° F., or from 50° F. to 200° F., or from 50° F. to 150° F., or from 50° F. to 120° F. The cement slurry may be cured for from 1 day to 14 days, such as from 3 to 14 days, or from 5 to 14 days, or from 7 to 14 days, or from 1 to 3 days, or from 3 to 7 days.

EXAMPLES

The following examples illustrate one or more features of the present disclosure. It should be understood that these examples are not intended to limit the scope of the disclosure or the appended claims in any manner.

Example 1

A casing coupon wettability test was performed using an Example A Oil-Based Mud and an aqueous solution of surfactant, referred to as the surfactant mixture. While the aqueous solution did not contain all of the components of a typical spacer fluid, the effect of the surfactant on wettability of surfaces could be evaluated. The composition of the Example A oil-based mud used in the casing coupon wettability test is described in Table 1, where VG-69 is an organophilic clay viscosifier commercially available from Schlumberger Limited, Carbo-Trol-A9 is a filtration control agent commercially available from Eni S.p.A., Carbo-Mul HT is a non-ionic emulsifier commercially available from Baker Hughes, and Carbo-TEC is a drilling mud commercially available from Baker Hughes.

TABLE 1

| Example A: Oil-Based Mud | |
| --- | --- |
| Component | Wt. % of Total Mud Composition |
| Diesel | 42.51 |
| Water | 12.77 |
| CARBO-MUL(TM) HT | 0.45 |
| VG-69 | 0.90 |
| CARBO-TROL (TM) A9 | 1.35 |
| $CaCl_2$ | 2.71 |

TABLE 1-continued

| Example A: Oil-Based Mud | |
| --- | --- |
| Component | Wt. % of Total Mud Composition |
| CARBO-TEC | 1.81 |
| $Ca(OH)_2$ | 0.90 |
| Barite | 32.08 |
| $CaCO_3$ (fine) | 2.26 |
| $CaCO_3$ (medium) | 2.26 |

The surfactant mixture was made by mixing 350 grams of water with 19.16 grams of $C_{13}H_{27}(OCH_2CH_2)_8OH$ at 4000 RPM (where $C_{13}H_{27}$ was an iso-tridecyl group). The casing coupon wettability test was performed as follows: first, a photograph was taken of a water drop on a casing coupon, which is a segment of the material used in a well bore casing. Next, the surfactant mixture was preheated to a temperature of 140° F. The casing coupon was then immersed in the Example A Oil-Based Mud for 10 minutes. The casing coupon was then removed from the Example A Oil-Based Mud and photographed with a water drop on it. Next, the mud coated casing coupon was attached to the rotor of a viscometer and immersed approximately two-thirds (⅔) deep into the surfactant mixture. The water drop was then removed from the viscometer and the casing coupon was rotated at 100 rpm for 30 minutes. After being rotated ⅔ deep in the surfactant mixture, the casing coupon was removed, a water drop was placed on it, and a third photograph was taken. The three photographs were then qualitatively compared to determine if the surfactant mixture provides increased water-wettability. The greater extent to which the water droplet spreads out on the casing coupon indicates greater water-wettability.

The photograph of the casing coupon before it was coated in Example Oil-Based Mud A is shown in FIG. 1A. The photograph of the casing coupon after it is immersed in Example Oil-Based Mud A, but before being rotated in Example Spacer Fluid 1 is shown in FIG. 1B. The photograph of the casing coupon after it was rotated in Example Spacer Fluid 1 is shown in FIG. 1C. As can be seen from the photographs, the casing coupon exhibited a fair water-wettability before being immersed in Example Oil-Based Mud A, poor water-wettability after being coated in Example Oil-Based Mud A, and good water-wettability after being rotated in Example Spacer Fluid 1. This is illustrated by how far the water droplet spread on the casing coupon.

Example 2

A rock core wettability test was also performed with Example Oil-Based Mud A and a surfactant mixture prepared by mixing 50 grams of water with 2.0 grams of the same surfactant utilized in Example 1. The rock core wettability test was performed in the same way as described in Example 1, but with a rock core rather than a casing sample The photograph of the rock core before it is coated in Example Oil-Based Mud A is shown in FIG. 2A. The photograph of the rock core after it is immersed in Example Oil-Based Mud A, but before being rotated in the surfactant mixture is shown in FIG. 2B. The photograph of the rock core after it was rotated in the surfactant mixture is shown in FIG. 2C. As can be seen from the photographs, the rock core exhibited a fair water-wettability before being immersed in Example Oil-Based Mud A, poor water-wettability after being coated in Example Oil-Based Mud A, and good water-wettability after being rotated in the surfactant mixture. This is illustrated by how far the water droplet spread on the rock core.

As can be seen from the examples, the Example Spacer Fluids with $C_{13}H_{27}(OCH_2CH_2)_8OH$, an ethoxylated alcohol surfactant provided good water-wettability on both the casing surface and the rock surface. This indicates that the ethoxylated alcohol surfactant can be added to a cement slurry to provide increased bonding between the casing, the cement, and the rock surface.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims infra should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the claims recited infra and their equivalents.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

As used in the Specification and appended Claims, the singular forms "a" "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided.

What is claimed is:

1. A well bore cementing system comprising:
   a spacer fluid positioned within a well bore, the spacer fluid comprising:
      a base fluid that is an aqueous-based fluid; and
      a first surfactant package consisting essentially of one or more surfactants having the chemical structure $R1-(OC_2H_4)_{x1}-OH$, where R1 is a hydrocarbyl group having from 5 to 20 carbon atoms, and x1 is an integer from 5 to 15, where the one or more surfactants of the first surfactant package has a HLB of from 12.5 to 13; and
   a cement slurry positioned within the well bore, the cement slurry comprising a second surfactant package consisting essentially of one or more surfactants having the chemical structure $R2-(OC_2H_4)_{x2}-OH$, where R2 is a hydrocarbyl group having from 5 to 20 carbon atoms, and x2 is an integer from 5 to 15, where the one or more surfactants of the second surfactant package has a HLB of from 12.5 to 13, where the first surfactant package includes all the surfactants of the spacer fluid, and the second surfactant package includes all the surfactants of the cement slurry.

2. The well bore cementing system of claim 1, where the cement slurry is in contact with the spacer fluid.

3. The well bore cementing system of claim 1, where the spacer fluid is in contact with a drilling fluid and the cement slurry.

4. The well bore cementing system of claim 1, where x1 is an integer from 5 to 10, x2 is an integer from 5 to 10, or both.

5. The well bore cementing system of claim 1, where x1 is 8, x2 is 8, or both.

6. The well bore cementing system of claim 1, where R1 is a hydrocarbyl group comprising from 10 to 15 carbon atoms, R2 is a hydrocarbyl group comprising from 10 to 15 carbon atoms, or both.

7. The well bore cementing system of claim 1, where R1 is a hydrocarbyl group comprising 13 carbon atoms, R2 is a hydrocarbyl group comprising 13 carbon atoms, or both.

8. The well bore cementing system of claim 1, where R1 is a branched hydrocarbyl group, R2 is a branched hydrocarbyl group, or both.

9. The well bore cementing system of claim 1, where R1 is an iso-tridecyl group, R2 is an iso-tridecyl group, or both.

10. The well bore cementing system of claim 1, where:
the one or more surfactants of the first surfactant package has the structure:

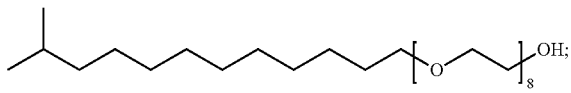

the one or more surfactants of the second surfactant package has the structure:

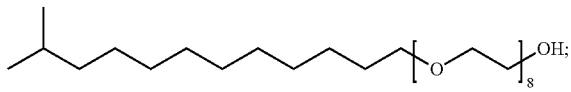

or both.

11. The well bore cementing system of claim 1, where the weight ratio of base fluid to the one or more surfactants of the first surfactant package is from 100:1 to 100:20.

12. The well bore cementing system of claim 1, where the base fluid comprises at least 90 wt. % water.

13. The well bore cementing system of claim 1, where the spacer fluid further comprises a weighting agent.

14. The well bore cementing system of claim 1, where the spacer fluid further comprises a viscosifier.

15. The well bore cementing system of claim 1, where the cement slurry further comprises a cement precursor and water.

16. The well bore cementing system of claim 1, where the one or more surfactants of the first surfactant package and the one or more surfactants of the second surfactant package have the same chemical composition.

17. The well bore cementing system of claim 1, where:
the spacer fluid is in contact with a drilling fluid and the cement slurry;
x1 and x2 are 8;
R1 and R2 are a branched hydrocarbyl group comprising 12 carbon atoms;
the weight ratio of base fluid to the one or more surfactants of the first surfactant package is from 100:1 to 100:20;
the base fluid comprises at least 90 wt. % water; and
the spacer fluid further comprises a weighting agent and a viscosifier.

18. A method for cementing a well bore, the method comprising:
introducing a spacer fluid into the well bore such that at least a portion of a drilling fluid positioned in the well bore is displaced by the spacer fluid, the spacer fluid comprising:
a base fluid that is an aqueous-based fluid; and
a first surfactant package consisting essentially of one or more surfactants having the chemical structure R1—(OC$_2$H$_4$)$_{x1}$—OH, where R1 is a hydrocarbyl group having from 5 to 20 carbon atoms, and x1 is an integer from 5 to 15, where the one or more surfactants of the first surfactant package has a HLB of from 12.5 to 13; and
introducing a cement slurry into the well bore such that at least a portion of the spacer fluid is displaced by the cement slurry, the cement slurry comprising a second surfactant package consisting essentially of one or more surfactants having the chemical structure R2—(OC$_2$H$_4$)$_{x2}$—OH, where R2 is a hydrocarbyl group having from 5 to 20 carbon atoms, and x2 is an integer from 5 to 15, where the one or more surfactants of the second surfactant package has a HLB of from 12.5 to 13, where the first surfactant package includes all the surfactants of the spacer fluid, and the second surfactant package includes all the surfactants of the cement slurry.

19. The method of claim 18, where:
the spacer fluid is pumped into a first conduit defined by an interior wall of a tubular in the well bore;
the cement slurry is pumped into the first conduit;
at least a portion of the drilling fluid exits the well bore through a second conduit defined by an exterior wall of the tubular and a wall of the well bore; and
the cement is formed in the second conduit.

20. The method of claim 18, where the cement slurry is in contact with the spacer fluid.

21. The method of claim 18, where the spacer fluid is in contact with a drilling fluid and the cement slurry.

22. The method of claim 18, where x1 is an integer from 5 to 10, x2 is an integer from 5 to 10, or both.

23. The method of claim 18, where x1 is 8, x2 is 8, or both.

24. The method of claim 18, where R1 is a hydrocarbyl group comprising from 10 to 15 carbon atoms, R2 is a hydrocarbyl group comprising from 10 to 15 carbon atoms, or both.

25. The method of claim 18, where R1 is a hydrocarbyl group comprising 13 carbon atoms, R2 is a hydrocarbyl group comprising 13 carbon atoms, or both.

26. The method of claim 18, where R1 is a branched hydrocarbyl group, R2 is a branched hydrocarbyl group, or both.

27. The method of claim 18, where R1 is an iso-tridecyl group, R2 is an iso-tridecyl group, or both.

28. The method of claim 18, where:
the one or more surfactants of the first surfactant package has the structure:

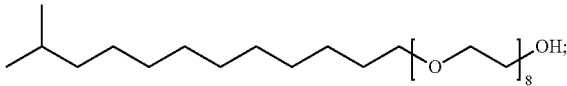

the one or more surfactants of the second surfactant package has the structure:

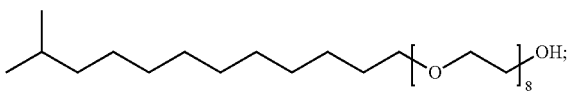

or both.

29. The method of claim 18, where the weight ratio of base fluid to the one or more surfactants of the first surfactant package is from 100:1 to 100:20.

30. The method of claim 18, where the base fluid comprises at least 90 wt. % water.

31. The method of claim 18, where the spacer fluid further comprises a weighting agent.

32. The method of claim 18, where the spacer fluid further comprises a viscosifier.

33. The method of claim 18, where the cement slurry further comprises a cement precursor and water.

34. The method of claim 18, where the one or more surfactants of the first surfactant package and the one or more surfactants of the second surfactant package have the same chemical composition.

35. The method of claim 18, where:

x1 and x2 are 8;

R1 and R2 are a branched hydrocarbyl group comprising 13 carbon atoms;

the weight ratio of base fluid to the one or more surfactants of the first surfactant package is from 100:1 to 100:20;

the base fluid comprises at least 90 wt. % water; and the spacer fluid further comprises a weighting agent and a viscosifier.

* * * * *